(12) United States Patent
Pisani

(10) Patent No.: US 7,117,205 B2
(45) Date of Patent: Oct. 3, 2006

(54) METHOD FOR SEARCHING A COLLECTION OF LIBRARIES

(76) Inventor: Robert Pisani, 300 El Teyonal, Orinda, CA (US) 94563

( * ) Notice: Subject to any disclaimer, the term of this patent is extended or adjusted under 35 U.S.C. 154(b) by 386 days.

(21) Appl. No.: 10/052,849

(22) Filed: Oct. 23, 2001

(65) Prior Publication Data

US 2002/0062318 A1    May 23, 2002

Related U.S. Application Data

(60) Provisional application No. 60/242,889, filed on Oct. 24, 2000.

(51) Int. Cl.
*G06F 7/00* (2006.01)
*G06F 17/30* (2006.01)

(52) U.S. Cl. .............. 707/5; 707/100; 707/10
(58) Field of Classification Search ............ 707/5, 707/2, 10, 104.1, 100, 202, 3, 101, 1
See application file for complete search history.

(56) References Cited

U.S. PATENT DOCUMENTS

| | | | | |
|---|---|---|---|---|
| 5,778,363 A | * | 7/1998 | Light | 707/5 |
| 5,812,998 A | * | 9/1998 | Tsutsumi et al. | 707/2 |
| 6,108,057 A | * | 8/2000 | Kusanagi | 349/40 |
| 6,163,782 A | * | 12/2000 | Singhal | 707/104.1 |
| 6,199,067 B1 | * | 3/2001 | Geller | 707/10 |
| 6,496,228 B1 | * | 12/2002 | McGee et al. | 348/700 |
| 6,526,417 B1 | * | 2/2003 | Perry | 707/202 |
| 6,615,220 B1 | * | 9/2003 | Austin et al. | 707/104.1 |

\* cited by examiner

*Primary Examiner*—Greta Robinson
*Assistant Examiner*—Kuen S. Lu
(74) *Attorney, Agent, or Firm*—Lieberman & Brandsdorfer, LLC

(57) ABSTRACT

A method for searching identifying data in a library or a collection of libraries. The method includes the steps of compiling a master library of data and determining the overlap of data from an independent library to sub-library within the master library. The purpose is to determine the range of overlapping data between two libraries, and make recommendations of data omitted from one of the libraries if the libraries are determined to be closely related. In determining the proximity of the libraries, a comparison of names between the libraries is conducted based upon a factor. Thereafter, the libraries are assigned a rank based upon a criteria and a score is assigned to the library based upon the closeness of the rank of the data in the library to the data in the master library.

21 Claims, 3 Drawing Sheets

| | | | | | | | | | | | | | | |
|---|---|---|---|---|---|---|---|---|---|---|---|---|---|---|
| 72 — UserLibrary: | a, b, c, d, e | | | | | | | | | | | | | |
| 74 — SubLibrary: | 1 | 2 | 3 | 4 | 5 | 6 | 7 | 8 | 9 | 10 | | | | |
| 76 — a | x | x | | | x | x | x | x | x | x | | | | |
| 78 — b | x | | | x | | x | x | x | x | x | | | | |
| 80 — c | x | x | x | x | | | | | x | x | | | | |
| 82 — d | x | | | | x | x | | x | x | x | | | | |
| 84 — e | x | x | | x | x | x | | x | x | | | | | |
| 86 — f | x | | x | | | x | | | x | | | | | |
| 88 — g | x | x | x | | x | | | | x | | | | | |
| 90 — h | x | x | | x | x | x | x | | x | | | | | |
| 92 — i | x | x | | x | x | | x | | x | x | | | | |
| 94 — j | x | | | x | | | | | | | | | | |
| 96 — k | x | | | | x | | | | x | | | | | |
| 98 — l | | x | x | | x | x | x | | | x | | | | |
| 100 — m | | x | x | | x | x | x | | x | | | | | |
| 102 — n | | | x | | | | x | | | x | | | | |
| 104 — o | | | x | | x | x | | | x | x | | | | |
| 106 — p | | x | | | | | | x | x | | | | | |
| 108 — q | | x | | | | x | | | | | | | | |
| 110 — r | | x | | | x | x | | | x | x | | | | |
| 112 — s | | x | | | x | | | | x | x | | | | |
| | | | | | | | | | | | | | | |
| 114 — NearnessMetric: | 0 | 2 | 4 | 2 | 2 | 1 | 3 | 1 | 0 | 1 | | | | |
| | | | | | | | | | | | | | | |
| 116 — NM=0 | x | | | | | | | | x | | | | | |
| ID | f | g | h | i | j | k | l | m | n | o | p | q | r | s |
| 118 — Frequency | 1 | 1 | 2 | 2 | 1 | 2 | 0 | | | 1 | 1 | | 1 | 1 |
| | | | | | | | | | | | | | | |
| 120 — NM≤1 | x | | | | x | x | x | x | | | | | | |
| ID | f | g | h | i | j | k | l | m | n | o | p | q | r | s |
| 124 — Frequency | 3 | 2 | 3 | 3 | 1 | 3 | 2 | 2 | 1 | 3 | 2 | 0 | 2 | 2 |
| | | | | | | | | | | | | | | |
| NM≤2 | x | x | | x | x | x | | x | x | x | | | | |
| ID | f | g | h | i | j | k | l | m | n | o | p | q | r | s |
| Frequency | 3 | 4 | 6 | 5 | 2 | 3 | 4 | 4 | 1 | 4 | 2 | 2 | 5 | 4 |
| | | | | | | | | | | | | | | |
| NM≤3 | x | x | | x | x | x | x | x | x | x | | | | |
| ID | f | g | h | i | j | k | l | m | n | o | p | q | r | s |
| Frequency | 3 | 4 | 7 | 7 | 2 | 3 | 5 | 5 | 2 | 4 | 3 | 2 | 5 | 4 |

FIG. 3

METHOD FOR SEARCHING A COLLECTION OF LIBRARIES

CROSS REFERENCE TO RELATED APPLICATION(S)

This is a non-provisional utility patent application claiming benefit of the filing date of U.S. provisional application serial No. 60/242,889 filed Oct. 24, 2000, and titled "Algorithms for Searching a Collection of Libraries", which is hereby incorporated herein by reference.

BACKGROUND OF THE INVENTION

1. Technical Field

This invention relates to a method of compiling a library of data and categorizing the collected data. More specifically, the invention relates to a method for determining commonality of the collected data.

2. Description of the Prior Art

The matter of locating and determining common data among libraries of collected information is an issue facing information technology today. The prior art methods of addressing this problem have been used in the consumer industry. For example, electronic vendors make product recommendations to customers based upon other products purchased by other customers who also purchased your product. This is one solution of using collected information to make product recommendations. However, this solution is solely based upon a common product purchase, and prior purchase information in the vendor's database. There is a need in information technology to use collective libraries to determine consumers who share interests in products. The prior art algorithms are designed for use with libraries of users who have not ranked their sub-libraries, but have merely expressed an interest in the items in the library by having them included therein. Accordingly, there is a need for an algorithm that will search libraries of information for commonality data between multiple libraries.

SUMMARY OF THE INVENTION

This invention comprises a method for searching identifying data in a library or libraries within a selected population, and determined common data among the libraries.

A first aspect of the invention is a method of implementing a search for identifying information. A master library of data is compiled from users of a network. The master library consists of sub-libraries compiled from the users, with each user contributing one or more sub-libraries. Each sub-library consists of a list of identifying data. Thereafter, proximity of an independent library to a sub-library within the master library is determined. The step of determining proximity of an independent library to a sub-library includes comparing the list of identifying data in the independent library to the list of identifying data in the sub-library and determining the amount of commonality between the two lists. The degree of commonality is measured according to a function whose value depends upon the amount of commonality of entries in the two respective lists. The method includes determining the collection of sub-libraries within the master library whose proximity to the independent library is within a predetermined factor. The method includes the ranking of the identifying data within the master library according to a criterion. The criterion is selected from the group consisting of: appearance in the master library, intensity of use by third parties, cost of use, ease of use, difficulty of use, and frequency of occurrence in selected portions of the master library.

In a second aspect of the invention, a system for searching data is implemented. A master library is compiled from users of a network. A manager is provided to determine proximity of an independent library to a sub-library within the master library. The master library comprises a collection of individual user libraries, wherein each user library is a list of identifying data. The system includes a procedure to assign a rank to a sub-library based upon a preselected criterion. The criterion is selected from the group consisting of: frequency of appearance in the master library, intensity of use by third parties, cost of use, ease of use, difficulty of use, and frequency of occurrence in selected portions of the master library. In addition, a score is assigned to the identifying data in the master library based upon the rank of the identifying data in the lists of identifying data in the master library. The score is based upon repetition between a score library and the sub-library.

A third aspect of the invention is an article comprising a computer-readable signal bearing medium readable by a computer system. The article includes a master library compiled from users of a computer network. The medium provides means for determining proximity of an independent library to a sub-library within the master library. The proximity-determining means compiles names in the libraries that are common. The article also ranks lists within the libraries based upon a criterion.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 is a chart illustrating the implementation of the proximity metric.

DESCRIPTION OF THE PREFERRED EMBODIMENT

Overview

Figure 1:
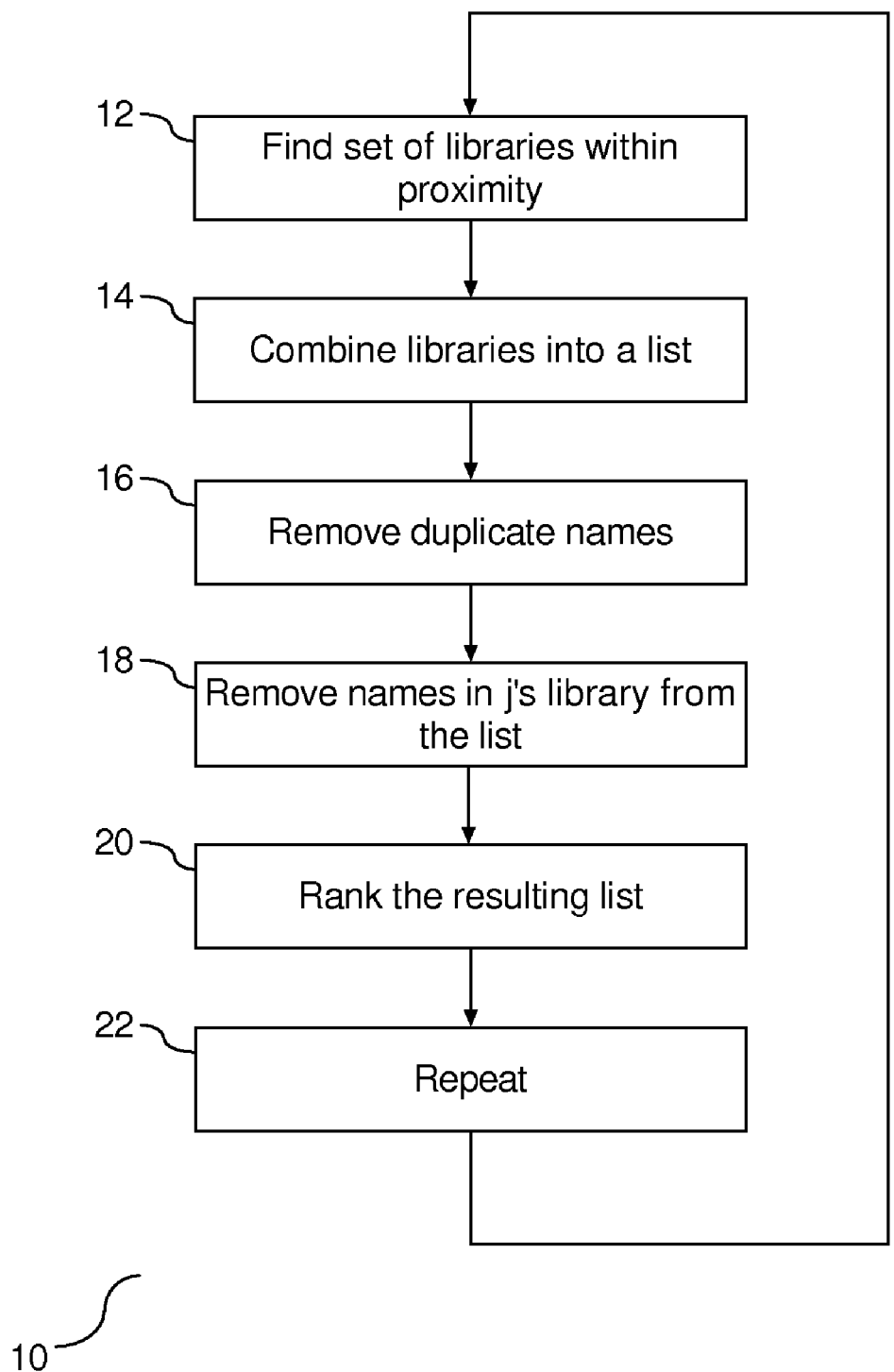
FIG. 1 is a flow diagram of a process for compiling a list of common names within a collection of libraries according to the preferred embodiment of this invention, and is suggested for printing on the first page of the issued patent.

Libraries of data are essentially collections of categorized data. The data may be categorized by a variety of subject matter. Each category of data in the library is identified by a name. The name is generally in the form of an alphanumeric string. In addition, each name in the library is also associated with attributes that are properties of the name or the item identified by the name. An attribute may be in the form of the size of the library or another defining characteristic of the library. A set of libraries may be compiled into a master library. Accordingly, each library is a list of names identified by defining characteristics.

Technical Background

A library is a list of names. A user is a person or entity with one or more libraries. A master library is a collection of libraries called sub-libraries, in this context. A user of the master library is someone who has contributed one or more sub-libraries to the master library and whose sub-library or sub-libraries are part of the master library. An independent user is someone who is consulting the master library with their own sub-library, and/or someone who has contributed their sub-library to the master library. In general, an independent user is referenced as such when they make use of the algorithm to derive information from the master library. The proximities measured by the algorithm provide measures of similarity between the two libraries and provide the independent user with information about libraries related to theirs and about the degree of relationship. An independent user may consult the master library to measure proximity between the independent user's sub-library and the sub-libraries of the master library.

A user entering a population of libraries may seek to search for a library or a collection of libraries of interest. The purpose of the preferred embodiments disclosed herein is to search a master library or a sub-library therein to compare a selection of libraries or a single library with a user library and to receive recommendations for data from the selected library or selection of libraries that fall within a predetermined proximity to the user library or to a selected sub-library. If the potential selection is not predetermined, the first step is to search for a library or a set of libraries. In the searching process, the user may view the library or libraries available for selection. Accordingly, the first step in the process is to view libraries within the master library, if deemed necessary, and to select any and all libraries which appear to share common subject matter.

In the system herein, it is often desirable to define a proximity of an independent library to another library within a master library. The proximity can be defined by a proximity factor which is based upon a function of two libraries. Given two libraries, the proximity metric measures the proximity from a first library to a second library. The function of the proximity metric is shown in the following examples.

EXAMPLE 1

There are two libraries, L(j) and L(k). Library L(j) has a list of names contained therein known as $(w_1, w_2, w_3, \ldots w_n)$ and library L(k) has a list of names contained therein defined as $(v_1, v_2, v_3, \ldots V_m)$. The proximity metric from library L(j) to L(k) is defined as the quantity of names in the list of L(k) that are not in the list of library L(j), i.e. the proximity metric is the quantity of names that must be added to the library L(j) to create a list that includes the names in library L(k).

EXAMPLE 2

There are two libraries, L(j) and L(k). Library L(j) has a list of names contained therein known as $(w_1, w_2, w_3, \ldots w_n)$ and library L(k) has a list of names contained therein defined as $(v_1, v_2, v_3, \ldots v_m)$. The proximity metric is defined as the percentage of names in the lists of library L(j) that are not in the list of the names in the lists of library L(k). A low value for the proximity metric informs that operator that a high percentage of names in the library of L(j) are also in the library of L(k).

The proximity of one library to another may be used to define a set of sub-libraries which are within a defined proximity. A user may set the proximity factor from their library to any sub-library in the master library of the system. The resulting set of libraries will include those libraries that are within the set proximity factor to the user library. This resulting set of libraries will contain names and attributes that should be of interest to the user.

With the proximity factor alone, the user can compile a list of common names within a collection of libraries. FIG. 1 is a chart 10 illustrating the process of compiling such a list. The first step 12 requires the user to select a proximity function to find all other user libraries in the system within a predefined or a defined proximity of the library of the user. All the names in the libraries found to meet the criterion of step 12 are then combined into a single list 14, and all duplicate names are removed from the list 16. The names in the library of the user are then removed from the list 18, producing a list with all names from sub-libraries of users that are within a defined proximity factor. Thereafter, the compiled list of names is ranked 20. The ranking is conducted by assigning a score to each name in the compiled list from step 16. The default assigned score of a name is the number of sub-libraries in the master library containing that name. The process outlined in FIG. 1 may be repeated 22 for other libraries and their sub-libraries. Accordingly, the process outlined in FIG. 1 is a process for compiling a list of common data from a set of libraries within a defined population and with a defined proximity factor.

In a preferred embodiment of the invention, a rank is assigned to names in libraries prior to any comparison and secondary compilation. The process of ranking identifying data utilizes the names and attributes with each library and/or sub-library. There are different procedures for ranking names. In general, a rank is a real number that is created by a user or an algorithm. The following are suggested algorithms that may be utilized in the ranking process: frequency of appearance in the master library, intensity of use by third parties, cost of use, ease of use, difficulty of use, and frequency of occurrence in selected portions of the master library. The suggested algorithms are not limited to these and may include alternative algorithms that enhance the ranking process. Once a ranking has been conducted, a library based upon the name and their ranks may be compiled. This compiled library would categorize data upon these two attributes. Similar to unranked data, a proximity metric may be utilized for measuring the distance between two libraries based upon distance and ranking. Given two libraries, the proximity based upon rank measures the proximity from a first library to a second library in conjunction with the rank measure. Accordingly, the function of the proximity-using rank is to measure the closeness between two rankings of common attributes.

For example, there are two libraries, L(j) and L(k). Library L(j) has a list of names contained therein known as $(w_1, w_2, w_3, \ldots w_n)$ and library L(k) has a list of names contained therein defined as $(v_1, v_2, v_3, v_m)$. The set of names common to both libraries is defined as W. L(j) ranks the names in the library as $(r_1, r_2, \ldots r_n)$ and L(k) ranks the names in their library as $(s_1, s_2, \ldots s_n)$. The standard measure between the two rankings is:

$$(1/n) \Sigma \text{ abs } (r_i - s_i). \qquad \text{Equation 1}$$

Since most users searching the master library will be interested in finding users or sub-libraries containing a large percentage of names that are common to their own library, the proximity metric in conjunction with the ranking algorithm enhance the opportunities for locating useful information.

Figure 2:
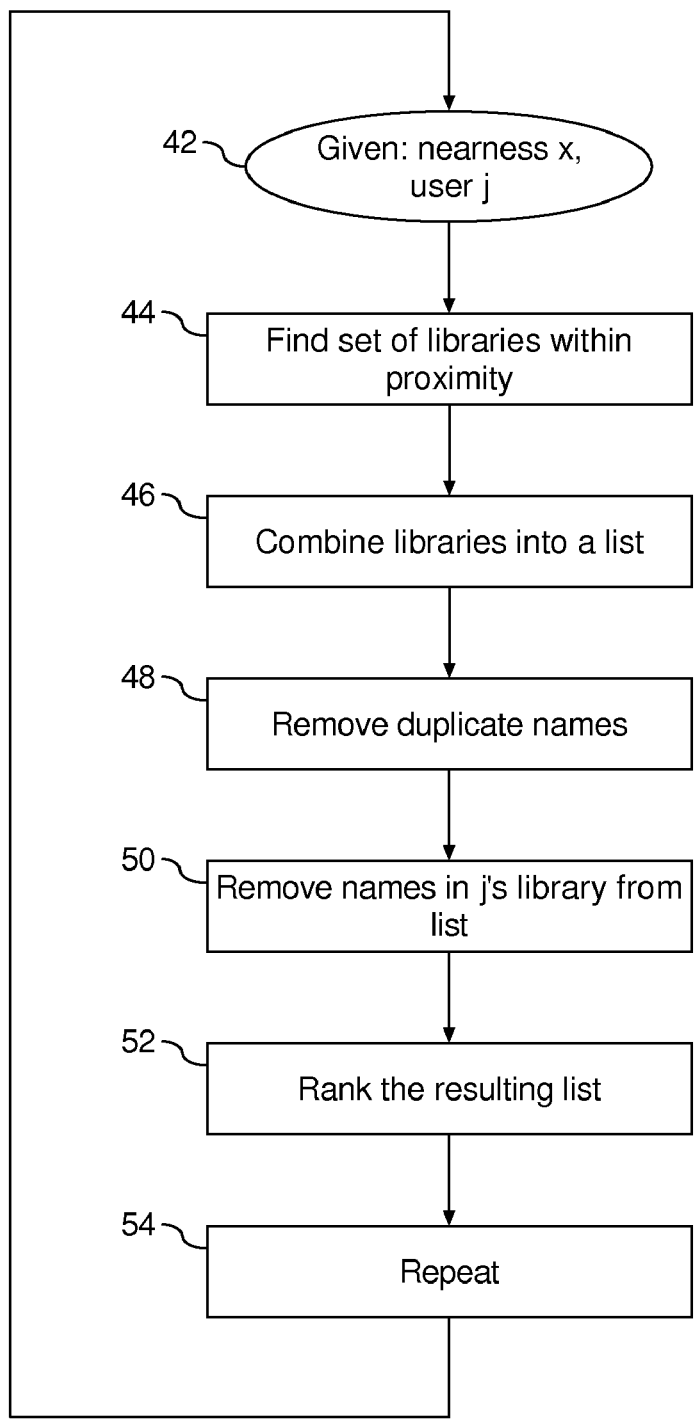
FIG. 2 is a flow diagram of a process for determining proximity in conjunction with the ranking algorithm.

FIG. 2 is a chart 40 illustrating the process of determining proximity in conjunction with the ranking algorithm. The process is utilized to determine users or sub-libraries of the system who share libraries having common data and within a given proximity. The sub-library and it's proximity to the independent user's library are given values 42. All sub-libraries of the master library are assigned a score. The score is a measure of the proximity of an independent user's library to the sub-library in the master library 44, and is the distance between the rankings, see Equation 1. All sub-libraries that are within the predefined proximity to the independent user's library are combined into a list 46 and all duplicate names are removed from the list 48. The names in the library of the independent user are then removed from the list 50. The resulting list is then ranked 52. The process of ranking assigns a score to each entry in the list at step 44. The default score is the average rank of the names in the libraries of users within the predefined proximity whose libraries contain the names. This process may be repeated 54 as often as necessary.

In addition to ranking libraries based upon proximity and distance, the system can also measure rank changes in a ranked libraries. It is common for the data in the libraries to be dynamic rather than static and as such the ranking of the data is subject to change. As noted above, each master library and each sub-library is an organized compilation of names categorized by attributes. A rank of a name in a library may be subject to change by a factor of time. The following equation illustrates the change in the rank over time:

$$\text{RankIncrease}[t]-\text{RankIncrease}[0]=\text{RankIncrease} \quad \text{Equation 2}$$

Accordingly, the rank increase factor allows a user to determine how a specific name in a library is performing in relation to the population of the system as a function of time.

FIG. 3 is a chart 70 illustrating the implementation of the nearness metric. In the chart, the user library 72 contains five names: a, b, c, d and e. The master library contains a list of the sub-libraries 74 in which each of the ten sub-libraries have data common to the user library. Each row 76 through 112 has indicia indicating the presence of the name in the indicated sub-library. The nearness metric row 114 is an integer for each sub-library 76-112. The integer represents the quantity of names in the sub-library that do not match with the names in the user library 72. Row 116, indicating a nearness metric of zero, contains indicia for sub-libraries one and nine. The frequency row 118 indicates the quantity of times a name in the sub-library appears with a nearness metric of zero. Similarly, row 120 indicates which sub-libraries have a proximity metric of one to the user library 72. Row 122 contains indicia for sub-libraries one, six, eight, nine and ten. The frequency row 124 indicates the quantity of times a name in the sub-library appears with a nearness metric of one. The remainder of the rows in the chart indicate the proximity factor and frequency for different values as shown. Accordingly, chart 70 is merely an illustration of the statistics available to the user upon conducting proximity and frequency analysis in the given example, and of the statistics available to the algorithm for finding collections of sub-libraries related to the independent user's sub-library.

Advantages Over The Prior Art

The statistical and factual information provided by the analysis disclosed herein provides users with libraries, and access to libraries, that share common data. The purpose of the analysis is to allow users to search for specific libraries based upon criteria such as topic, subject matter, etc. Once a user has selected the topic, they can search the libraries available within the topic. Each library is by definition an organized listing of data. The independent user can perform a statistical analysis and use the herein described algorithms to compare the data in the independent user's library to the data in the sub-libraries of the master library. In addition, the independent user may select a sub-library or a collection of sub-libraries that are within a given proximity to the library of the independent user, and rank the data in those sub-libraries in a way that will highlight the data of greatest interest to the independent user. This allows the user to receive recommendations based upon the user-defined proximity of their library to that of a selected library. Accordingly, the libraries selected and statistical analysis are all user-selected and user-defined based upon specified criteria.

Alternative Embodiments

It will be appreciated that, although specific embodiments of the invention have been described herein for purposes of illustration, various modifications may be made without departing from the spirit and scope of the invention. In particular, an individual user may submit their library to the population and request receipt of all libraries in the population with a given proximity metric defined by the user. This allows a user to locate all sub-libraries within the master library that share common data to a specified degree. Accordingly, the scope of protection of this invention is limited only by the following claims and their equivalents.

We claim:

1. A computer implemented method for searching identifying data, comprising:
    (a) compiling a master library of data from users of a network, wherein said master library includes a collection of individual user libraries;
    (b) measuring proximity of a first library to a second library, including assigning a standard of proximity between a ranking of names in said first library to a ranking of names in said second library as $(1/n)\Sigma\text{abs}(r_i-s_i)$, where r is a ranking of names in said first library, s is a ranking of names in said second library, i is a coefficient for a current ranking of names in one of said libraries, and n is the quantity of names in said libraries, wherein the step of measuring proximity includes comparing, a list of names within said libraries that are common within a predetermined factor; and
    (c) compiling a list of common names within a collection of said libraries based upon said measured proximity factor.

2. The method of claim 1, further comprising forwarding data from one of said libraries to a list based upon a user defined proximity value.

3. The method of claim 1, wherein said master library includes a collection of individual user libraries.

4. The method of claim 1, wherein said user libraries are a collection of lists of said identifying data.

5. The method of claim 1, wherein the step of measuring proximity includes comparing a list of names within said libraries that are common within a predetermined factor.

6. The method of claim 4, further comprising the step of assigning a rank to a sub-library based upon a criterion.

7. The method of claim 6, wherein said criteria is selected from the group consisting of: frequency of appearance in said master library, intensity of use by third parties, cost of use, ease of use, difficulty of use, and frequency of occurrence in selected portions of said master library.

8. The method of claim 6, further comprising the step of assigning a score to said identifying data based upon proximity of said rank of identifying data in said sub-library to said lists of identifying data in said master library.

9. The method of claim 8, wherein said score is based upon a quantity of redundancy between said scoring library and said sub-library.

10. The method of claim 6, further comprising the step of viewing sub-libraries within said master library.

11. The method of claim 10, further comprising the step of searching for said sub-library with a common subject mailer to said independent library.

12. The method of claim 1, further comprising forwarding data from said libraries to a list based upon a user defined proximity value.

13. The method of claim 1, wherein said master library includes a collection of individual user libraries.

14. The method of claim 1, wherein said user libraries are a collection of lists of said identifying data.

15. The method of claim 1, wherein the step of measuring proximity includes comparing a list of names within said libraries that are common within a predetermined factor.

16. The method of claim 1, further comprising the step of assigning a rank to a sub-library based upon a criterion.

17. The method of claim 16, wherein said criteria is selected from the group consisting of: frequency of appearance in said master library, intensity of use by third parties, cost of use, ease of use, difficulty of use, and frequency of occurrence in selected portions of said master library.

18. The method of claim 16, further comprising the step of assigning a score to said identifying data based upon proximity of said rank of identifying data in said sub-library to said lists of identifying data in said master library.

19. The method of claim 18, wherein said score is based upon a quantity of redundancy between said scoring library and said sub-library.

20. The method of claim 16, further comprising the step of viewing sub-libraries within said master library.

21. The method of claim 20, further comprising the step of searching for said sub-library with a common subject matter to said independent library.

* * * * *